Dec. 30, 1924.
E. H. SMITH
PREHEATING TORCH
Original Filed June 19, 1919
1,521,335
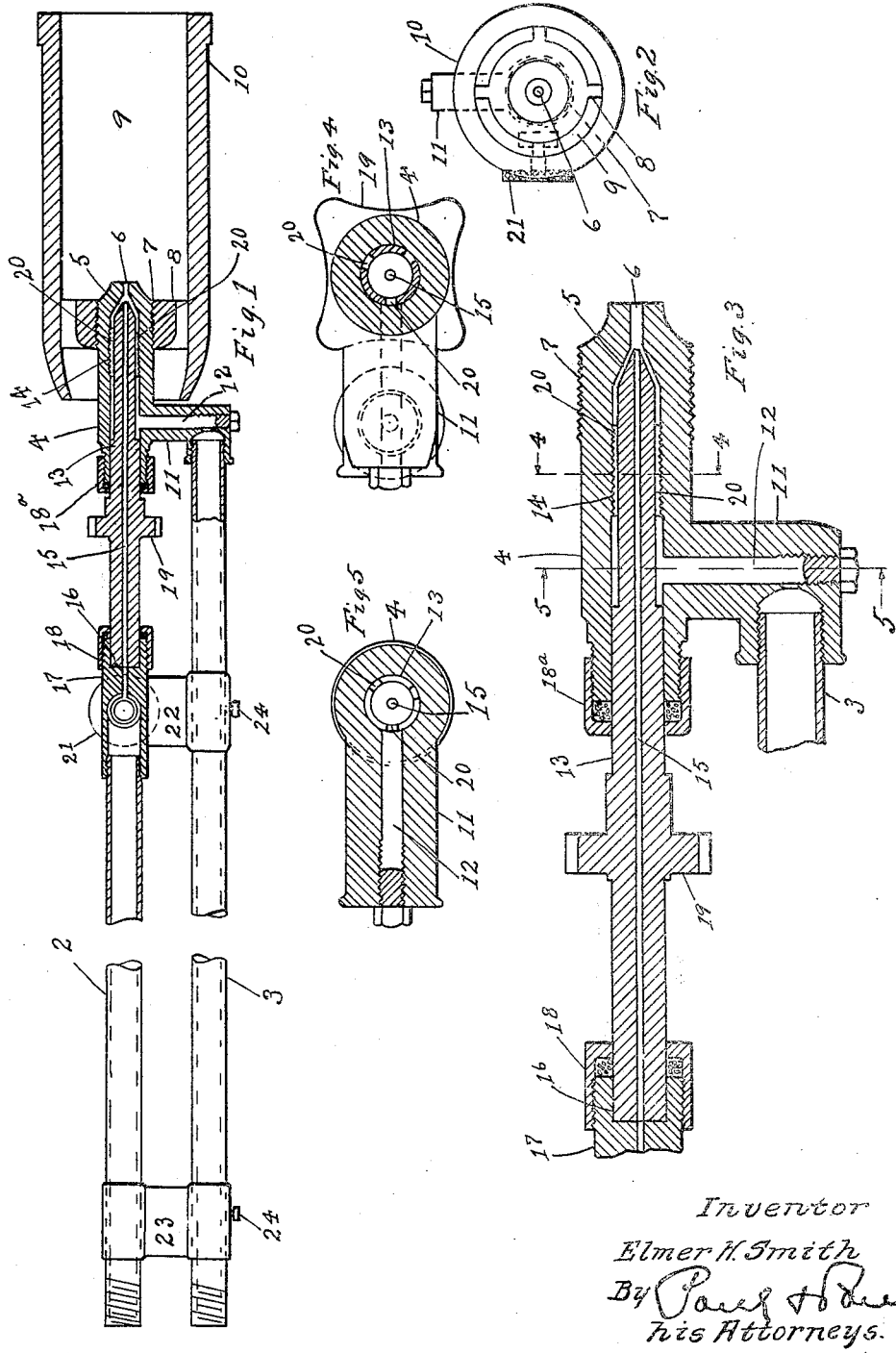
Inventor
Elmer H. Smith
By [signature]
his Attorneys.

Patented Dec. 30, 1924.

1,521,335

UNITED STATES PATENT OFFICE.

ELMER H. SMITH, OF MINNEAPOLIS, MINNESOTA.

PREHEATING TORCH.

Application filed June 19, 1919, Serial No. 305,845. Renewed June 12, 1924.

*To all whom it may concern:*

Be it known that I, ELMER H. SMITH, a citizen of the United States, resident of Minneapolis, county of Hennepin, State of Minnesota, have invented certain new and useful Improvements in Preheating Torches, of which the following is a specification.

My invention relates to torches designed particularly for preheating metal articles preparatory to welding and the object of the invention is to provide a torch which can be conveniently manipulated and the relative proportions of air and liquid fuel in the mixture accurately regulated, and the feed of the torch easily controlled.

Other objects of the invention will appear from the following detailed description.

In the accompanying drawings forming part of this specification,

Figure 1 is a view of a preheating torch, partially in section, embodying my invention, Figure 2 is an end view of the same, Figure 3 is an enlarged detail view, showing the manner of mounting the tip in the heat-containing mixing chamber, Figure 4 is a sectional view on the line 4—4 of Figure 3, Figure 5 is a sectional view on the line 5—5 of Figure 3.

In the drawing, 2 represents a pipe communicating with a suitable source of air under pressure and 3 is a similar pipe through which the liquid fuel is delivered to the torch nozzle. I may use kerosene, crude oil or any other suitable hydro-carbon that is capable of being atomized to form a preheating flame in the torch. 4 represents the nozzle having a mixing chamber 5 therein communicating with a port 6 in the end of the nozzle in threaded engagement at 7 with a cross bar 8 that is formed near one end of the chamber 9 of the burner 10. The nozzle 4 has a lateral extension 11 provided with a passage 12 which communicates with the mixing chamber 5 and with the pipe 3 through which the liquid hydrocarbon is supplied to the mixing chamber. A tip 13 is fitted into the nozzle 4 and has a threaded engagement therewith at 14 and is provided with a longitudinal duct 15 that is concentric with the mixing chamber and with the port 6 of the nozzle. The inner end of the tip is preferably tapered and the wall of the mixing chamber is also tapered in a similar manner so that the narrow annular space may be formed between the tip and the wall of the nozzle through which the liquid hydrocarbon is drawn to be atomized at its point of mixture with the jet of air pressure discharge through the duct of the tip 13. The rear end of the tip is seated in a socket 16 provided in a housing 17 and a cap 18 has threaded engagement with said housing and encircles the tip and forms a close gas and air-tight joint around the tip and a similar cap 18$^a$ has a threaded engagement with the rear end of the nozzle 4, preventing the suction of air or gas around the point of entrance of the tip into the nozzle.

I prefer to provide a finger grip 19 on the tip by means of which it may be adjusted lengthwise to increase or decrease the area of the passage between the tapered inner end of the tip and the tapered walls of the nozzle.

As shown in Figure 4, a series of grooves 20 are formed transversely of the threads of the tip connecting the rear portion of the mixing chamber with the forward portion thereof, so that when the tip is mounted in the nozzle the hydro-carbon may flow through these grooves to be atomized at the point of mixture with the air under pressure as it is discharged from the tip. This air is released under sufficient pressure to create a partial vacuum in the annular passage in the rear of the nozzle so that the hydro-carbon will be sucked into the mixing chamber and into direct contact with the jet of air.

The liquid hydrocarbon becomes atomized through contact with the jet of air and when ignited, projects the flame through and beyond the burner 10. The operator of the torch, by the manipulation of the finger grip 19, can easily and quickly regulate the feed of the liquid through the mixing chamber and thereby positively control the flame in the burner.

I prefer also to provide a valve 21 in the casing 17 for regulating the flow of air to the burner tip. The torch may be made in various sizes and various changes may be embodied in the construction of the torch and still be within the scope of my invention.

Suitable bridges 22 and 23 are mounted on the pipes 2 and 3 and secured by means of set screws 24 which, when loosened, allow adjustment of these bridges to different positions. The burner 10 is open at each end and may be readily detached from the nozzle whenever desired.

I claim as my invention:

1. A preheating torch comprising a nozzle having a mixing chamber therein and a discharge orifice, a liquid fuel pipe communicating with a port in the side wall of said mixing chamber, a tip having one end fitting within said mixing chamber and provided with a finger grip outside said chamber and mounted for movement forward and backward in said chamber, the forward end of said tip being adjacent the discharge opening in said mixing chamber and normally spaced from the walls of said chamber to form a liquid fuel passage, and said tip having a longitudinal duct therethrough communicating with a source of air under pressure, the suction created by the discharge of air from said tip drawing the liquid fuel through the passage around said tip to mingle with the fluid from said tip.

2. A preheating torch comprising a nozzle having a mixing chamber therein and a discharge opening at one end, the wall converging toward said opening, said nozzle also having a port leading to said mixing chamber and means for connecting a source of liquid fuel supply with said port, a tip having one end fitting within said nozzle and mounted for longitudinal adjustment therein and having passages leading from the rear portion of said mixing chamber to the discharge orifice thereof, said tip having a longitudinal duct therethrough communicating at one end with a source of air under pressure, the discharge of air through said tip creating a suction between the walls of said tip and said nozzle and drawing the liquid fuel therethrough.

3. A preheating torch comprising a nozzle having a discharge orifice and a mixing chamber in the rear of said orifice, the side wall of said mixing chamber having a port communicating with a liquid fuel pipe, a tip fitting within said nozzle and having a stuffing-box connection with the rear portion thereof, and a forward portion of less diameter than the rear portion extending through said mixing chamber and spaced from the walls thereof, and having a tapered forward end terminating near the junction of said nozzle orifice and said mixing chamber, the forward portion of said tip between said fuel-supply port and said nozzle orifice having a comparatively long threaded connection with the walls of said mixing chamber, and dividing it into forward and rear sections, said rear section communicating with said fuel-intake port, and said threaded connection having ducts leading therethrough from the rear section of said mixing chamber to the forward section thereof, the tapered end of said tip being spaced from the walls of said chamber, and said tip having a fluid pressure duct therein leading to said nozzle orifice, a vacuum being created between the tapered end of said tip and the wall of said mixing chamber for sucking the oil from said intake port through said ducts to the orifice of said nozzle.

4. A preheating torch comprising a nozzle having a mixing chamber therein and a discharge orifice communicating with said chamber, the side wall of said chamber having a liquid-fuel intake port, a tip fitting within said nozzle and extending through said mixing chamber and havng a tapered end terminating near said nozzle orifice, said tip being spaced from the walls of said chamber and having a longitudinal duct therein for delivering a fluidpressure to the tapered end of said tip and the orifice of said nozzle, said tip having means dividing said mixing chamber into forward and rear sections, and communicating passages between said sections through which the liquid fuel may flow to the orifice of said nozzle, the end of said tip being in the rear of the forward extremity of said nozzle orifice and concentric therewith, and a hollow burner having means at one end for mounting it on the forward portion of said nozzle.

5. A preheating torch comprising a nozzle having a mixing chamber provided with a discharge orifice, said chamber having walls converging toward said orifice, a tip fitting within said chamber and having a tapered end for adjustment toward and from the converging walls of said chamber, said tip having a duct therein for delivering air under pressure to said chamber, said chamber also having an intake port in the rear of the orifice of said duct and communicating with the space between said tip and the walls of said chamber, whereby a suction will be created through said port when air pressure is admitted to said duct, and a liquid fuel pipe under atmospheric pressure communicating with said port.

In witness whereof I have hereunto set my hand this 9th day of June, 1919.

ELMER H. SMITH.